United States Patent [19]
Iwanaga et al.

[11] Patent Number: 5,456,132
[45] Date of Patent: Oct. 10, 1995

[54] WRIST MECHANISM FOR INDUSTRIAL ROBOT

[75] Inventors: Toshiaki Iwanaga; Kazuhiro Haniya; Tsuyoshi Tanoue, all of Kitakyushu, Japan

[73] Assignee: Kabushiki Kaisha Yaskawa Denki, Kitakyushu, Japan

[21] Appl. No.: 930,419

[22] PCT Filed: Jan. 29, 1992

[86] PCT No.: PCT/JP92/00088

§ 371 Date: Apr. 8, 1994

§ 102(e) Date: Apr. 8, 1994

[87] PCT Pub. No.: WO92/13683

PCT Pub. Date: Aug. 20, 1992

[30] Foreign Application Priority Data

Jan. 31, 1991 [JP] Japan ................................. 3-011146

[51] Int. Cl.⁶ ................................................. B25J 17/02
[52] U.S. Cl. ................... 74/490.06; 901/26; 901/29
[58] Field of Search .................. 74/479 BW, 490.06; 901/26, 29

[56] References Cited

U.S. PATENT DOCUMENTS

| | | | |
|---|---|---|---|
| 4,579,016 | 4/1986 | Soroka et al. | 74/461 |
| 4,690,012 | 9/1987 | Dahlquist et al. | 901/26 X |
| 4,807,486 | 2/1989 | Akeel et al. | 74/479 |
| 4,984,959 | 1/1991 | Kato | 901/26 X |

FOREIGN PATENT DOCUMENTS 63-185595  8/1988  Japan.

*Primary Examiner*—Allan D. Herrmann
*Attorney, Agent, or Firm*—Ladas & Parry

[57] ABSTRACT

A wrist mechanism for attachment to the tip end of a robot arm has a first speed reducer for rotation about an "α" axis that is coaxial with a "γ" axis of the robot arm. To the side of the robot arm is a second speed reducer for rotation about a "β" axis that is at a right angle with the "γ" axis of the robot arm. Bevel gears are respectively attached onto tip end of inner and outer rotation shafts of the robot arm. The bevel gear on the outer rotation shaft engages with an input bevel gear for "β" rotation on the "β" axis, thus transmitting wrist bending torque supplied from the robot arm. The bevel gear on the inner rotation shaft engages with a bevel gear on the "β" axis. The engaged bevel gear engages with a further bevel gear on one end of a shaft which is arranged at an acute angle with the "β" axis to rotate the shaft. On the other end of the rotated shaft a still further bevel gear engages with an input bevel gear on the first speed reducer for "α" rotation, thus transmitting wrist rotation torque supplied from the robot arm.

2 Claims, 3 Drawing Sheets

F I G. I

: 1

WRIST MECHANISM FOR INDUSTRIAL ROBOT

TECHNICAL FIELD

This invention relates to a wrist mechanism for an industrial robot, particularly to the one in which the swing axis at the tip end of the wrist is aligned on coaxial line with the axial center of the arm.

BACKGROUND ARTS AND THEIR PROBLEMS

In general, the wrist mechanism of industrial robots is the front-end mechanism in which robot operations should be integrated, so that not only revolution and rotation of what is called "α", "β", and "γ" axes be universal, but also the mechanism be small in size, smooth in rotational transmission and strong in force. One of the wrist mechanisms for an industrial robot according to the prior art is disclosed by the Laid-Open Japanese Patent Application No. 1988-185595. The side sectional view of the prior art is shown in FIG. 3.

In FIG. 3, the outer rotation shaft 7 is supported by the bearing 51 within the robot arm 63 ("γ" axis) whose speed is reduced by the speed reducer (not shown), and further the inner rotation shaft 8 is supported by the other bearing within the outer rotation shaft 7. One output power transmitted by the outer rotation shaft 7 enters the speed reducer 6 on the "β" axis via the bevel gears 5a and 5b to make up and down rocking (what is called "β" rotation), while the other output power transmitted by the inner rotation shaft 8 enters the speed reducer 11 on the "α" axis via the bevel gears 4a and 4b, the spur gear train 9a, 9b and 9c and the bevel gears 2a and 2b to make what is called "α" rotation of the wrist 1.

In the wrist mechanism for an industrial robot according to the prior art, however, the speed reducer 11 for "α" rotation is arranged on the member 10 at the front end portion of the wrist, and the speed reducer 6 for "β" rotation is arranged close to the inner rotation shaft (8), thus both constituting the last stage of the respective power transmission systems: In more detail, one output power transmitted enters the speed reducer 11 on the "α" axis via the bevel gears 4a and 4b, the spur gear train 9a, 9b and 9c and the bevel gears 2a and 2b to make the "α" rotation of the wrist 1, while the other output power transmitted enters the speed reducer 6 via the bevel gears 5a and 5b to make the "β" rotation. With this configuration, the gear train 9a, 9b and 9c necessitates the idle spur gear 9b for adjusting potential backlash taking place between the spur gears 9a and 9c in an assumed direct engagement of them, thus requiring many pieces of rotating parts, resulting in a large moment of inertia.

SUMMARY OF THE INVENTION

OBJECT

To solve the above problems, an object of the present invention is to provide a wrist mechanism for an industrial robot in which the spur gear train for "α" axis is replaced by a combination of bevel gears, where the intermediate shaft axis intersects at acute angles with the "β" and "α" axes, thus minimizing the number of gears required without changing the original arrangement of the "α" axis speed reducer.

TECHNICAL MEANS FOR SOLVING THE PROBLEMS

To achieve the above object, a wrist mechanism for an industrial robot according to the present invention is characterized in that:

a (first) speed reducer is provided for an "α" rotation, at the wrist portion attached to the tip (or front) end of the robot arm, so as to be in coaxial line with the axis of the robot arm;

a (second) speed reducer is provided for a "β" rotation, at the side of and closer to the robot arm, so as to be at right angle with the axis of the robot arm;

outer and inner rotation shafts are rotatably supported in the robot arm so as to be in coaxial line with the "γ" axis;

bevel gears are attached on the respective tip ends of the outer rotation shaft and the inner rotation shaft;

a bevel gear is provided to the shaft of the second speed reducer so as to engage with the first bevel gear, for receiving a bending power to the "β" axis; and the second bevel gear engages with a bevel gear attached on one end of a "β" rotation shaft supported at right angle with the robot arm "γ" axis;

a rotation shaft is provided at an acute angle with the "β" rotation shaft so as to be rotatably supported;

bevel gears are attached to one and the other ends of the rotation shaft so as to engage with the mating bevel gears;

a bevel gear is attached to the shaft of the first speed reducer so as to engage with the mating bevel gear for receiving a rotational power to the "α" axis; and a rotation of the wrist portion is made via the first speed reducer by the input rotation power transmitted from the inner rotation shaft through the bevel gearing.

The above configuration such as the intermediate power transmission shaft making an acute angle (not right angle) intersecting with "α" and "β" axes can not only minimize the number of parts required, but also reduce the moment of inertial of the wrist mechanism as well as minimize the chance of possible backlash adjustment.

In the above configuration, as described above:

The three spur gears in the gear train for "α" rotation according to the prior art is replaced by one intermediate shaft with two bevel gears at both ends, thus reducing the number of parts and gears, resulting in a further miniaturized and compact wrist mechanism for an industrial robot.

DESCRIPTION OF THE PREFERRED EMBODIMENT

Now preferable embodiments of the wrist mechanism for an industrial robot according to the present invention will be described, referring to the accompanying drawings.

Figure 1:
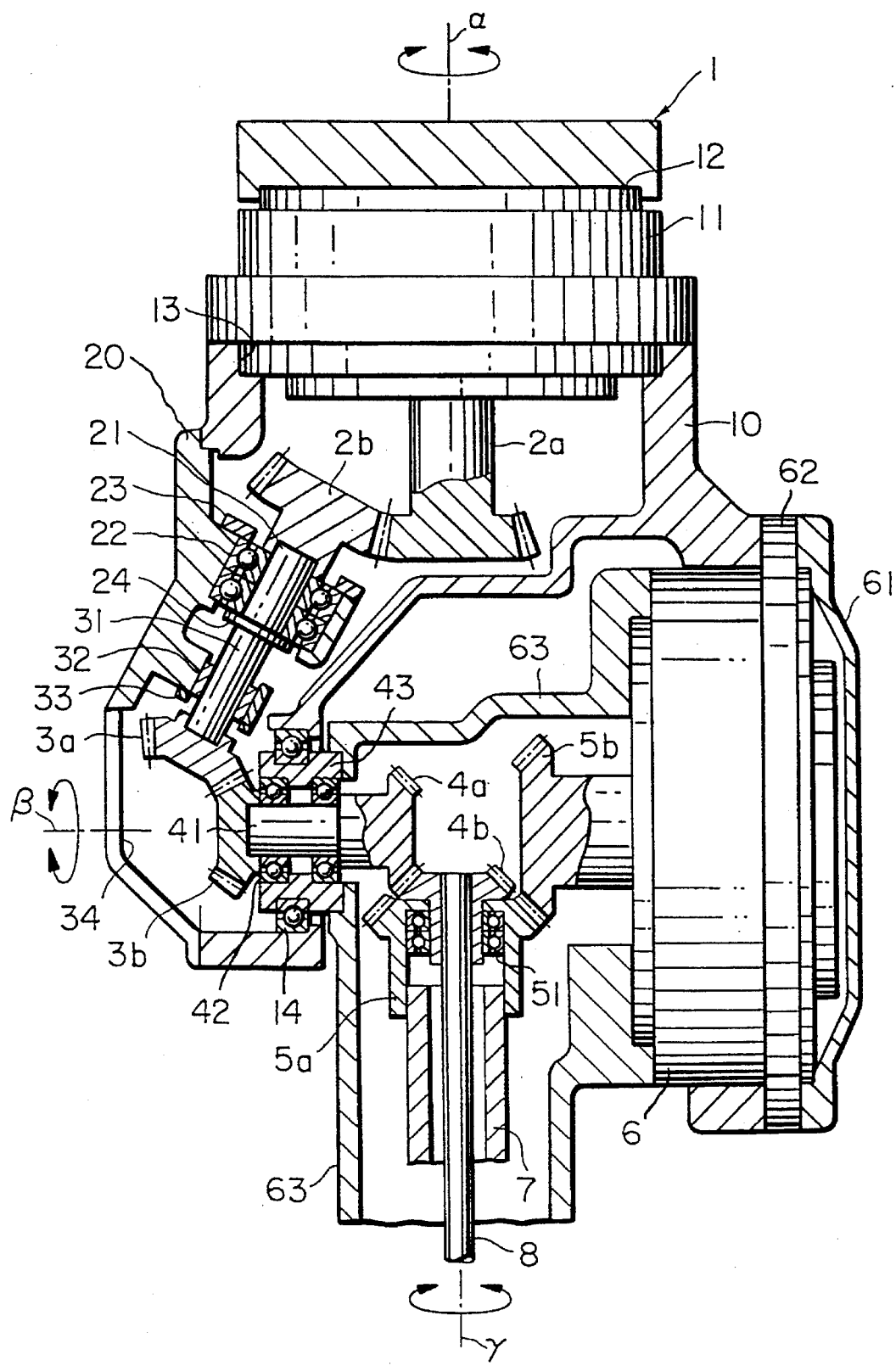
FIG. 1 is a sectional side elevation view showing an embodiment of a wrist mechanism for an industrial robot according to the present invention.
Figure 2:
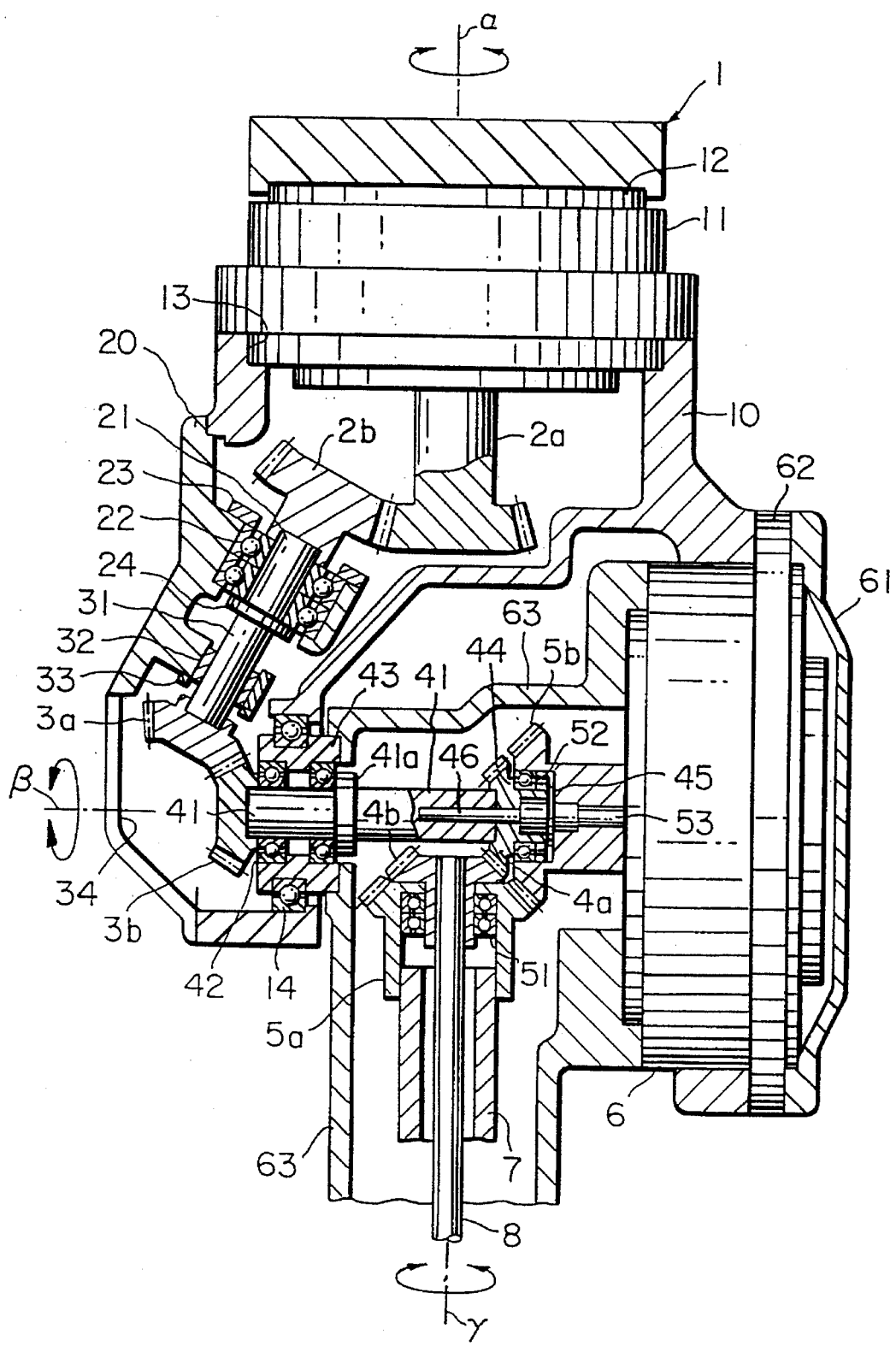
FIG. 2 is a sectional side elevation view showing another embodiment of a wrist mechanism for an industrial robot according to the present invention.
Figure 3:
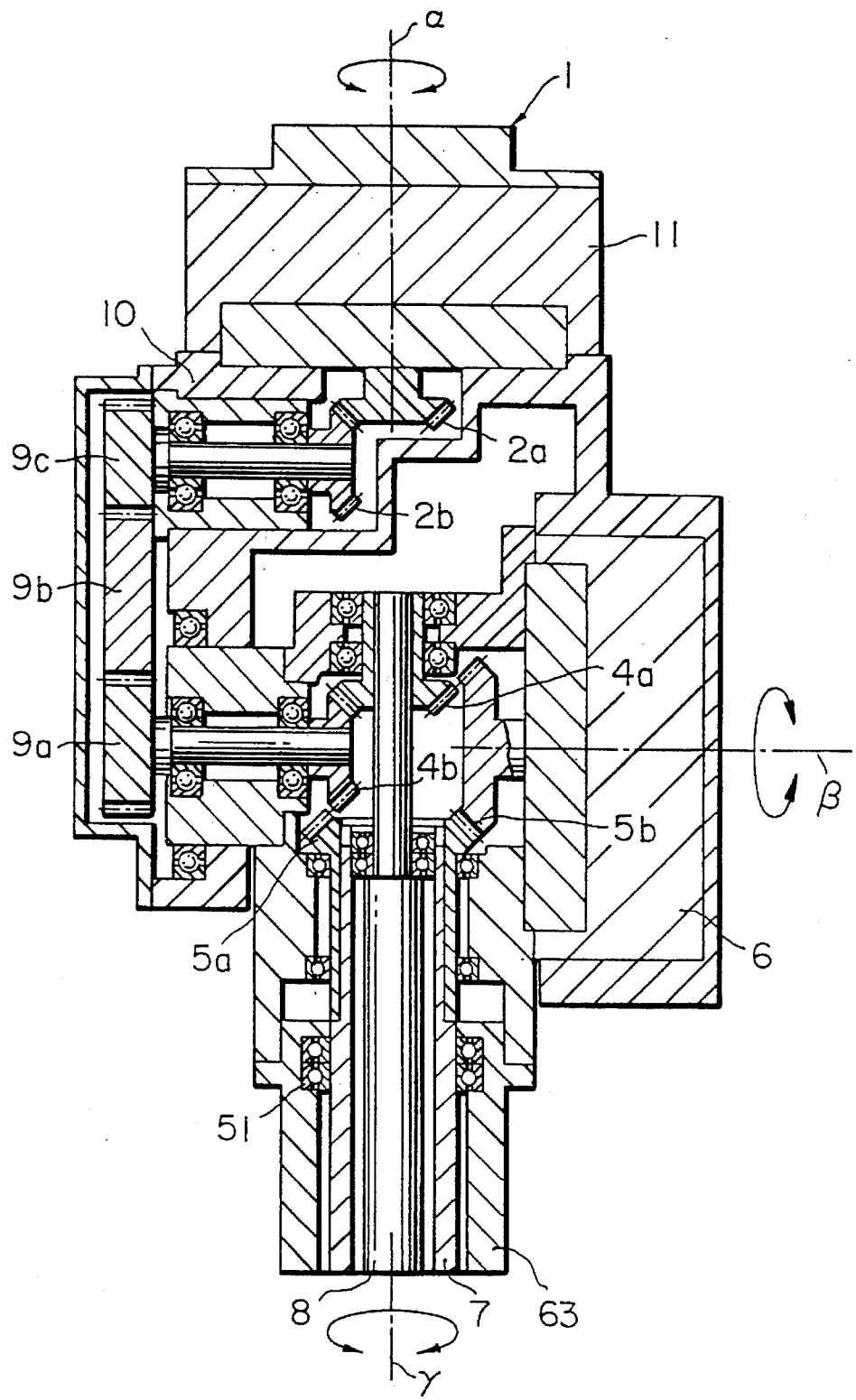
FIG. 3 is a sectional side elevation view showing a wrist mechanism for an industrial robot according to the prior art.

Parts in the embodiments according to the invention shown in FIGS. 1 and 2, which have the same or similar functions as or to those of the prior art shown in FIG. 3 are given the same numerals and signs as those of the prior art.

In FIG. 1, in the one embodiment according to the present invention:

A first speed reducer 11 for the "α" axis (for wrist rotation) is provided in coaxial line with the "γ" axis (of the robot arm 63) at the front end portion of a wrist portion 1. A second speed reducer 6 for the "β" axis (for wrist bending) is provided at right angle with the "γ" axis (of the robot arm 63) at the side portion of the wrist portion 1 close to the robot arm 63.

First, explanation is made about how to transmit wrist rotational power from the robot arm 63 to its front end component or the first speed reducer 11 for the "α" axis:

Within the robot arm 63 an outer rotation shaft 7 is supported by a bearing 51 in coaxial line with the robot arm 63. Further, within the outer rotation shaft 7 an inner rotation shaft 8 is also supported by the bearing 51 in coaxial line with the robot-arm 63. A second bevel gear 4b attached to the upper end of the inner rotation shaft 8 is engaged with a fourth bevel gear 4a screwed onto one end of a horizontal "β" rotation shaft 41. A fifth bevel gear 3b is attached to the other end of the "β" rotation shaft 41. The fourth bevel gear 4a is rotatably supported by a bearing 42 in a housing 43 fixed to the robot arm 63. The inner and outer rings of the bearing 42 are positioned in place by the housing 43, the shoulder of the "β" rotation shaft 41 and the engagement portion of the fifth bevel gear 3b.

A rotation shaft 31, 24, 21 is provided at an acute angle with the "β" rotation shaft 41. Onto one end of the rotation shaft 31, 24, 21 a sixth bevel gear 3a is fitted so as to engage at the acute angle with the fifth bevel gear 3b. The rotation shaft 31, 24, 21 consists of a collar 24, small diameter section 31 and large diameter section 21. The small diameter section 31 is rotatably supported by a needle bearing 32, which is further fixed by a retaining ring 33 and a housing 20.

The large diameter section 21 is rotatably supported by a bearing 22, which is further fixed by a ring-shape retainer 23 and the housing 20. On the end of the large diameter member 21 a seventh bevel gear 2b is attached so as to engage with an eighth bevel gear 2a attached to the lower end of the "α" shaft connected to the first speed reducer 11.

The first speed reducer 11 is fitted into a recess 13 machined on an upper end of a (rotatable about "β" axis) member 10, so as to rotate the wrist portion 1 about "α" axis by an amplified rotational torque with reduced speed via an output end section 12.

Next, explanation is made about how before transmitting the output power wrist bending power from the robot arm 63 to its side end component or the second speed reducer 6 for the "β" axis:

Within the robot arm 63, on the upper end of the outer rotation shaft 7 a first bevel gear 5a is attached so as to be rotatably supported by the bearing 51 (rotatable relative to the inner rotation shaft 8). The first bevel gear 5a is engaged with a third bevel gear 5b attached to the inner end of the input shaft of the second speed reducer 6. The second speed reducer 6 reduces the input rotational speed. An amplified bending output torque with reduced speed is transmitted to the member 10 via an output shaft 62, so as to make a bending (rocking) motion of the member 10. The member 10 is rocking-free supported by a bearing 14, which is further supported by the housing 43. Numeral 61 is a grease cover, and 34 is a normally-closed window opened in a cover 20 for serving to maintenance work such as adjustment or repair of bevel gear backlash or wear. Around the window is provided a seal (not shown) for blocking oil leaking. The cover 20 and the grease cover 61 both serve to oiling to the bevel gears and the rotating parts.

FIG. 2 is a sectional side elevation view showing the other embodiment of a wrist mechanism for an industrial robot according to the present invention:

In this embodiment, the previous input transmission method to the first speed reducer 11 for "α" rotation embodied by the first embodiment is further enhanced for stabilization: More particularly the transmission configuration of rotational torque from the robot arm 63, through the second bevel gear 4b on the inner rotation shaft 8, then to the fourth bevel gear 4a on the horizontal "β" rotation shaft 41 is improved for a more stabilized arrangement of the fourth bevel gear 4a and for eliminating possible irregularities of gear transmission with the "β" rotation shaft supported at both far ends (instead of the previous cantilever construction).

In more detail, a hole is opened in the axial center of the third bevel gear 5b. Through the hole, a bolt 53 is screwed into the input shaft (not shown) of the second speed reducer 6 for bending "β" rotation. Into a recess bored in the third bevel gear 5b a bearing 52 is fitted.

Further, the bearing 52 is fitted onto a boss projecting from the fourth bevel gear 4a, which is further bolted coaxially into the "β" rotation shaft 41 by bolt 46.

On the reducer side of the fourth bevel gear 4a or on the boss a shoulder 44 is provided. The shoulder 44 and a ring-shape retainer 45 position the inner ring of the bearing 52 in axial place from both sides.

As described above in detail, since the wrist mechanism for an industrial robot according to the present invention engages a part (intermediate) of bevel gearing at acute angle with bevel gears on the "α" and "β" rotation shafts, the wrist mechanism can not only reduce the number of gears and related parts and, but also the moment of inertia of the whole system, thus remarkably enhancing acceleration/deceleration capability. Further the reduction in number of gear meshes may serve to reduce the man power for adjusting or repairing the possible backlash or wear of the gears.

It goes without saying that this invention is not limited to the above described embodiments but applies to every other embodiment to the extent the content is not departed from the following claims.

We claim:

1. A wrist mechanism for an industrial robots, comprising:

a first speed reducer for a wrist-rotation shaft being provided in front of a wrist portion which is provided at a tip portion of a robot art, in the manner of being provided on an "α" axis in coaxial with a "γ" axis of said robot arm;

a second speed reducer for a wrist-bending shaft being provided on a side of said wrist portion, in the manner of being provided on a "β" axis at right angle with the "γ" axis of said robot arm;

outer and inner rotation shafts rotatably supported in said robot arm, in the manner of being provided on an axis in coaxial with the "γ" axis;

a first bevel gear attached on a tip end of said outer rotation shaft;

a second bevel gear attached on a tip of said inner rotation shaft;

a third bevel gear being provided as a means for receiving torque supplied from said wrist-bending shaft so as to engage with said first bevel gear;

a wrist-bending mechanism being provided for transmitting torque of said wrist-bending shaft via said third bevel gear and torque of a rotation of said wrist-bending shaft via said second speed reducer;

a fourth bevel gear attached on one end of a rotation shaft supported at right angle with said "γ" axis of said robot arm so as to engage with said second bevel gear;

a fifth bevel gear attached on the other end of said "β" rotation shaft to engage said fourth bevel gear;

a sixth bevel gear being provided on one end of an inclined rotation shaft rotatably supported at an acute angle with an axis of said fifth bevel gear;

a seventh bevel gear attached to the other end of said inclined rotation shaft;

an eight bevel gear being provided as a means for receiving torque supplied from said first speed reducer attached to said inner rotation shaft; and a write-rotation mechanism being provided for transmitting a rotation of said inner rotation shaft via said eight bevel gear so as to engage with said seventh bevel gear.

2. The wrist mechanism for an industrial robot according to claim 1, further comprising:

a cylindrical hollow being opened in the center of said third bevel gear;

a bearing tightly inserted into an inner side surface of said hollow, and having an outer ring having an outer peripheral which is tightly fastened into said inner side surface of said hollow; and a projecting cylindrical portion having an outer peripheral surface which is fastened to an inner surface of said bearing, and being formed by extending an inner side surface of said fourth bevel gear:

wherein said third bevel gear is fixed to said second speed reducer of the "β" rotation shaft by a bolt which is screwed into the "β" rotation shaft through the center portion of said cylindrical hollow; and said fourth bevel gear is fixed from the center of said projecting cylindrical portion to the "β" rotation shaft by a bolt.

* * * * *